INVENTORS
SHELDON BAER
MICHAEL J. TOTH
JOHN W. DUNNING

By Baldwin, Egan, Walling & Fetzer
ATTORNEYS

United States Patent Office 3,451,828
Patented June 24, 1969

3,451,828
PROCESSES FOR DEHYDRATING HEAT SENSITIVE SOLID MATERIALS
Sheldon Baer, South Euclid, Michael J. Toth, Lakewood, and John W. Dunning, Cuyahoga, Ohio, assignors to International Basic Economy Corporation, New York, N.Y., a corporation of New York
Continuation-in-part of application Ser. No. 462,539, June 9, 1965. This application Aug. 14, 1968, Ser. No. 752,517
Int. Cl. A23b 1/04, 3/04; B01d 1/00
U.S. Cl. 99—199
16 Claims

ABSTRACT OF THE DISCLOSURE

A process is presented for removing moisture from a heat sensitive material such as moisture-bearing cottonseed meats by preparing a fluidized mixture of ground wet raw material in a fluid having a higher boiling point than water, in this case preferably cottonseed oil, mixing the first material with a previously dehydrated heated slurry of the same heat sensitive material, in this case cottonseed meat slurry, to drop the temperature of the mixture and form a second mixture, and thereafter explosively release the moisture from said material by flash cooling said second mixture and applying a low pressure of about two inches of mercury, and maintaining the flash cooling of the second mixture for at least about 20 seconds to provide for the spontaneous release of substantially all of the moisture from the material.

---

Figure 1:
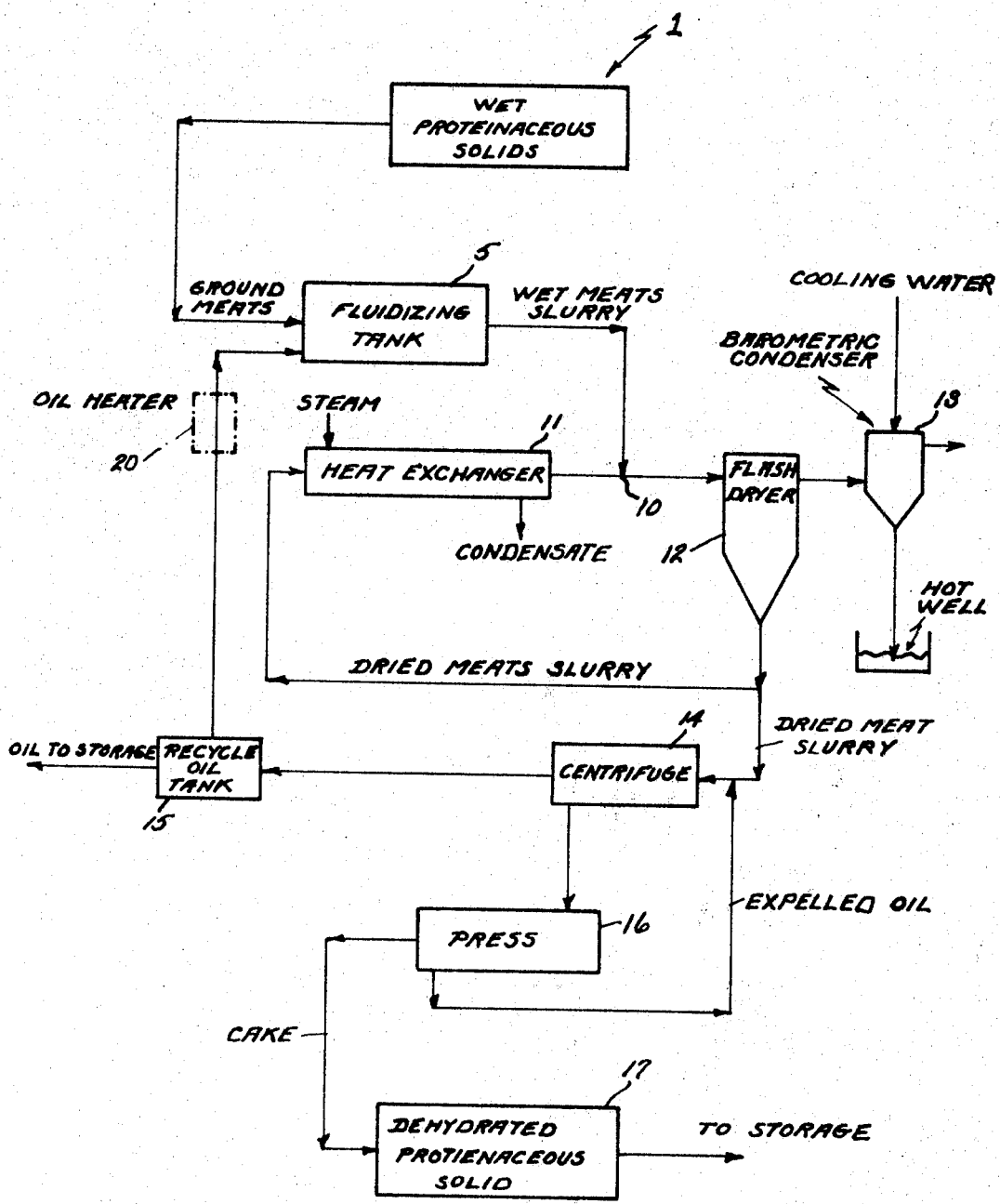

This application is a continuation-in-part of our copending application Ser. No. 462,539, filed June 9, 1965, now abandoned.

This invention relates to the dehydration of heat sensitive solid materials and more particularly to the removal of moisture from fluidized particles of solid proteinaceous materials such as animal tissues, fish tissues, vegetable seeds and nuts.

In processing of vegetable seeds and nuts and meat tissues for the production of a meal and an oil or fat, such commodities must be cooked and dehydrated prior to oil or fat separation as set forth in United States Patent No. 2,629,722. The purposes of the cooking procedure are manifold, but are primarily directed toward rupturing of the oil cells and in some particular instances color body and toxic compound cells; the denaturalization or coagulation of the water soluble protein fractions; and thirdly, the destruction of the harmful bacteria and enzymes within the vegetable seed or flesh tissue. The thus cooked materials then must be dehydrated to an optimum moisture content for optimum separation of the fat or oil from the proteinaceous residue. Because of the chemical nature of the proteinaceous materials involved, the activity of the enzymes within the natural material, the presence of color bodies, etc., the cooking and dehydrating systems employed have attempted to balance the destructive effects of temperature and time against the accomplishment of the above stated purpose.

According to United States Patent No. 2,629,722, it was found that a temperature treatment of rolled cottonseed meats, for example, at 200° F. for fifteen minutes when the meats were moistened to 13% water was optimum. Any appreciably higher temperature for longer times at reduced moisture content has a deleterious "browning effect" on the proteins. Any appreciably lower temperature for less time would not rupture the oil cells and detoxify the lipase enzymes, for example, which hydrolyze the oil contained therein. Historically, the above natural materials have been cooked and dried after a preliminary grinding without the addition of any other material. Such treatment involves the processing and conveying of a solid material through cookers and dryers which makes it very difficult to control the time to which the raw material is exposed to the temperature during treatment. All such systems are based on a probability retention time curve.

More recently, dehydration systems have been devised whereby the above mentioned commodities are reduced in particle size by themselves or in the presence of a fluid medium, the fluid medium preferably being the natural oil or fat that has previously been separated from the same type of raw material. In certain instances, just enough fat or oil has been added to the raw material to form a thick viscous slurry that could be pumped, but which was not strictly in a fluidized state. Other systems have involved the addition of sufficient oil or fat to be completely fluid in nature and permits their being pumped through pipes, heat exchangers, etc. These newer systems involve the reduction of particle size generally in the presence of added oil or fat to form a pumpable slurry. These slurries are then mixed with already dehydrated slurry and then heated under subatmospheric conditions for the removal of the moisture therefrom. In certain instances, the evaporation takes place in what is known to the art as a pot still. In these instances a batch of slurry is continuously pumped into and out of the batch still under vacuum while a source of heat is continuously being supplied. The operation is continued until the moisture is reduced to the desired level. In other instances, such raw material slurries are mixed with previously dried slurries and according to the same batch theory, but on a continuous basis, are passed through falling film evaporators wherein the slurries are subjected to heat during the evaporation or dehydration step.

It is an object of the present invention to remove moisture from a heat sensitive material such as moisture-bearing cottonseed meats by preparing a fluidized mixture of wet meats in a fluid that is preferably cottonseed oil, mixing the first mixture with a previously dehydrated heated cottonseed meat slurry of the same kind to drop the temperature of the mixture and form a second mixture, and thereafter explosively release the moisture from said meats by flash cooling said second mixture employing a low pressure of about 2″ Hg, and maintaining the flash cooling of said second mixture for at least about twenty seconds to provide for the spontaneous release of substantially all the moisture from said meats.

It is an object of the present invention to eliminate the subjection of the slurry of wet ground raw proteinaceous material to a heated surface during the evaporative step during a continuous process of dehydrating said material.

Another object of this invention is to eliminate the plugging of heat exchange tubes and evaporator tubes as a result of the wet ground raw material being exposed to the hot surface of such tubes in a continuous process of dehydrating the raw material at sub-atmospheric pressures.

Still another object of this invention is to provide a method whereby the time and temperature conditions of the evaporative step may be very precisely controlled even in a continuous dehydrating process and to reduce the temperatures historically employed for the removal of moisture from proteinaceous materials in such a way that the quality of the products is improved.

Figure 2:
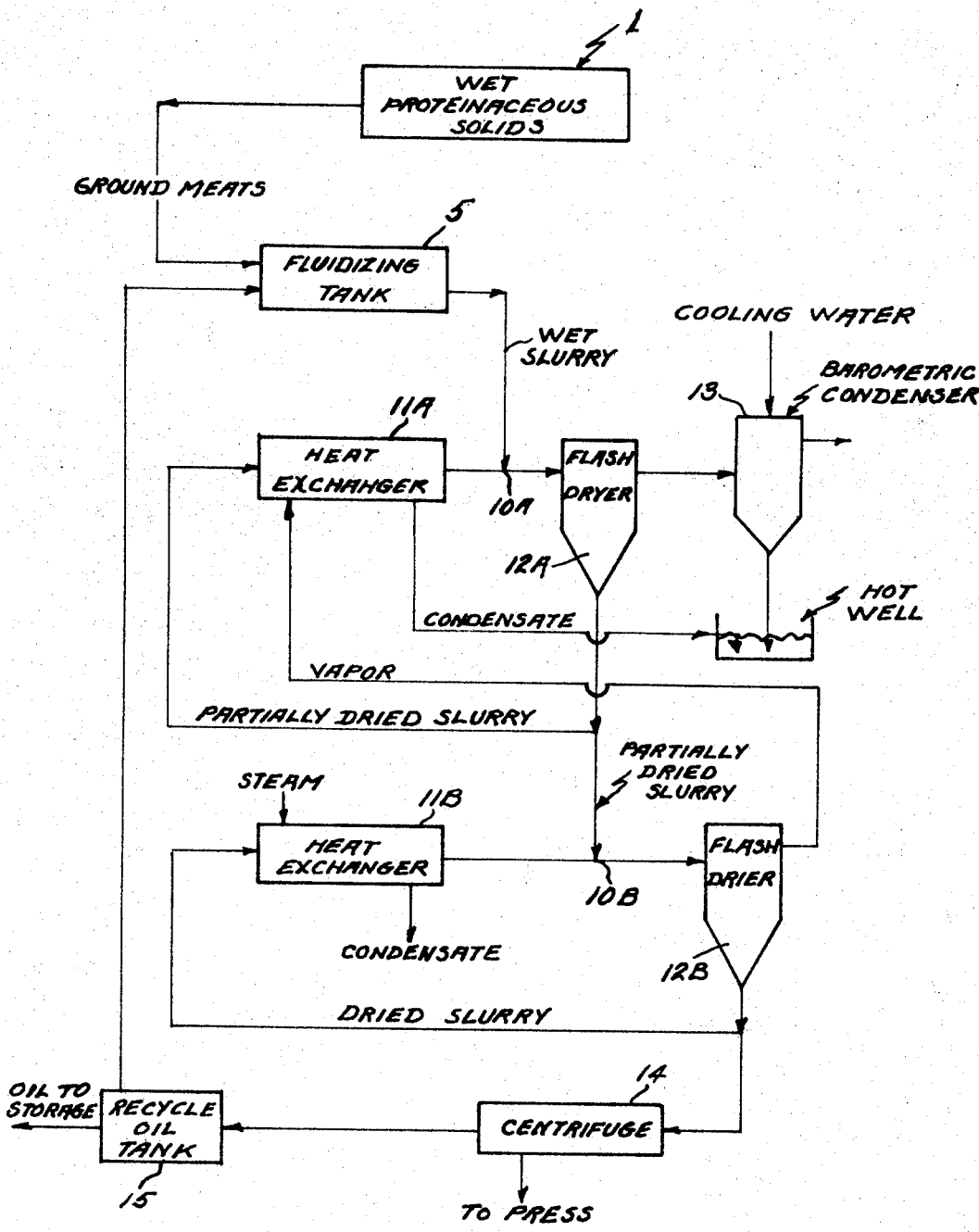

These and other objects will become apparent from the specification that follows, the appended claims, and the drawings in which:

FIG. 1 is a diagrammatic flow sheet of a continuous process of dehydrating a proteinaceous solid such as peanut meats according to the present invention; while FIG. 2 is a diagrammatic flow sheet of a modification of FIG. 1 wherein two heat exchangers and two flash dryers are used in combination.

The present invention provides a method of continuously dehydrating a solid proteinaceous material such as peanut meats at sub-atmospheric pressures without degrading the meats. As herein described the proteinaceous solid is fluidized with an oil or fat liquid to provide a first heated fluidized mixture. A previously dehydrated fluidized mixture of the same kind is added to the first mixture in amounts of about 2 to 20 times the volume of said mixture to form a second mixture and drop the temperature of said dehydrated fluidized mixture about 2 to 10° F. The process then continues by the step of treating the second mixture at a sub-atmospheric pressure of about 1 to 10 mm. Hg for about 20 to 50 seconds to explosively release the moisture from within the solid and provide an expanded porous dehydrated structure.

Referring to the drawings, a wet heat sensitive proteinaceous solid material 1 such as peanut meats is mixed with peanut oil in a fluidizing tank 5 to form a first fluidized mixture which, in turn, is mixed at point 10 with a second mixture which is a previous dehydrated fluidized peanut meat mixture, said second mixture being heated to about 210 to 250° F. in a heat exchanger 11 which can be a portion of an evaporator if desired. The first and second mixtures form a third fluidized mixture which, after it has been uniformly mixed for a mixing "dwell" time of about 3 to 7 seconds and preferably about 4 to 6 seconds and after its temperature is decreased about 2° to 10° F., is fed into a flash dryer 12 in which the chamber has a sub-atmospheric pressure of preferably about 1 to 3 mm. Hg abs. The third mixture is subjected to the sub-atmospheric pressure for a dwell time of at least about 20 seconds and preferably 25 to 35 seconds and thus cooled, which results in a dehydrated peanut meats slurry which is continuously removed from the bottom thereof. The moisture is flashed off to a barometric condenser 13. The dried meats are fed into a centrifuge 14 where the peanut oil is separated from the meats, the oil being removed to a recycle oil tank 15 from which oil is withdrawn to mix with the wet feed material in fluidizing tank 5.

Returning to the peanut meats that are discharged from centrifuge 14, the meats are processed in a high pressure press 16 which presses oil therefrom, which oil, in turn, is reprocessed by mixing with the feed stream to the centrifuge. The dehydrated proteinaceous solid product 17 is thus produced in cake form by an efficient process in which the solid is not degraded by the aforesaid usual destructive effects of temperature and time.

In the removal of water, however, from systems as comprehended herein, the water itself is contained within the capillary structure of the raw material. The vaporization of water from such solid matter, therefore, necessitates that the water molecules diffuse from the inner capillary structure of the raw material to the surface of the material from which the water then vaporizes. It has been found that the vapor pressure of water in such solid matter-solid systems is depressed as compared to water itself. Or, stating it in another way, the presence of the water in the capillary structure of the solid matter induces an effective boiling point rise of the water. The boiling point rise, however, is far greater than that experienced in classical systems of salt and water or sugar and water with or without crystals of the solute present. For example, a saturated solution of sucrose at 212° F. would contain approximately 83% by weight of sucrose. Such a concentrated solution would have an approximate 13.5° F. boiling point rise. It has been found, however, that systems of a proteinaceous solid, water and oil, have evidenced boiling point rises of as low as a minimum of about 20° F. to a high of about 60° F. or 75° F. or more.

A time element, also, is involved in the removal of moisture from the solid materials under consideration.

It has been found, for example, that a pumpable slurry of a comminuted animal tissue commodity, referred to in the trade as shop fat and bones, when heated to temperatures of 220° F. and then exposed to a pressure of two inches mercury absolute, will be freed of substantially all of its water content by evaporation within a period of time of about 25 seconds. Since water will boil in a pressure of two inches of mercury absolute at a temperature of 105° F., the above described evaporation system provides a total ΔT of 115° F. or a total driving force for moisture diffusion and evaporation of 115° F. In this particular fat-solids-water system, however, the boiling point rise of the water is of the magnitude of 40° F. Therefore, the effective ΔT is 115°—40° or 75° F. As the temperature of the fluidized system is increased the driving force (due to the temperature differential) likewise is increased, and the time to vaporize all of the moisture is decreased provided the same vacuum conditions are maintained. Likewise, as the temperature is decreased, the time for moisture removal is increased.

In general, for the commercial dehydration of most proteinaceous solids such as cottonseed meats, the lowest temperature within the evaporation system as it enters the flash dryer is about 180° to 210° F. The final temperature of the system after moisture removal ranges from about 175° to 200° F. although it can be as low as about 125° F.

It is possible, therefore, to "flash evaporate" moisture from solid particles in a fluidized system provided a sufficient ΔT relative to the boiling point of water under the existing pressure conditions and the temperature of the system is maintained and provided a sufficient period of time is allowed for the diffusion of the water from the inside of the particle and the subsequent evaporation of that moisture. This time has been discovered to be at least about 10 seconds for most proteinaceous solids such as cottonseed meats, shop bones and fat, fish meats, coagulated blood, and the like and is preferably at least about 20 to 25 seconds, although for some materials a dwell time of up to about 50 seconds is preferred. A system, therefore, can be utilized which does not require the additional heating of a fluidized system during the evaporative or water removal step. In the means and methods of this inventin, cottonseed meats, for example, after rolling to approximately ten thousandth of an inch thickness, as is common in the art, may be mixed with two or more parts cottonseed oil to form a pumpable slurry. A heat exchanger and vacuum flash tank may be arranged in a series so that relatively warm dehydrated slurry from the flash tank is heated in the heat exchanger to, for example, 220° F. This dry heated slurry at 220° F. is mixed with the slurry of the raw cottonseed meats at 70–150° F. in oil, the wet slurry being at 210–217° F. By recycling a preponderantly larger amount of dry slurry relative to the raw cottonseed meat slurry, a controlled temperature drop at the point of admixture in the order of about two to ten degrees F. may be achieved. This resultant mixed slurry is then pumped to the flash chamber under, for example, a pressure of two millimeters of mercury. Under these conditions the moisture will substantially all "flash evaporate" from the solid cottonseed meat particles within a time of approximately 25 seconds. Additionally, the temperature of the system will be reduced as a result of the evaporative cooling effect achieved. Having predetermined the ratio of dried recycle slurry to fresh feed slurry and knowing the moisture content of the feed, the exact pounds of water per hour to be evaporated may be calculated. The amount of sensible heat to vaporize such amount of water and finally the temperature drop of the system may then also be calculated. For example, if 500 gallons per hour of fresh feed slurry containing 1,100 pounds of cottonseed meats at 18% moisture are admixed with 6,000 gallons per hour of dry slurry approximately 200,000 B.t.u. of sensible heat will be required to evaporate the moisture of the system. This evaporative cooling would drop the temperature of the system approximately 4.5° F. There would also be a drop of approximately 2° upon mixing the fresh slurry with the dried slurry. By heating the dried slurry to 200° F., then mixing the fresh slurry thereto and pumping the resultant mixture to a flash tank at two inches mercury absolute a dry slurry at 193.5° F. would be obtained. A total excess ΔT of 88.5° F. would be available. This maximum temperature of about 200° F. to 205° F. may be compared to the maximum temperatures of 230° to 260° F. previously employed in the art.

The wet raw proteinaceous materials that can be processed according to the present invention are heat sensitive solid materials of animal and plant origin. Suitable animal materials are shop fat and bone, fish, poultry, offal, kill floor, coagulated blood, fish tissue and fish meats. Suitable plant materials are vegetable seeds and nuts including cottonseed meats and peanut meats.

It would be obvious to one skilled in the art that the conditions of time, temperature and moisture content of the feed material, after mixing with the dried recycle slurry, may be precisely controlled. For example, in processing of comminuted shop fat and bones, the cooking and drying conditions must produce a material that is:

(1) At a temperature above the melting point of the fat
(2) In which the oil cells have been ruptured
(3) In which the minimum denaturalization of the proteins occur
(4) In which the harmful bacteria, e.g. salmonella, have been destroyed.

It has been found that the above results are achieved by heating the recycle slurry to 220° F., employing a recycle to fresh feed slurry mix to furnish a temperature drop in the mix of 5° F. at the point of mixture and immediately flash evaporating in a vacuum of two inches mercury absolute pressure for a period of time of 20 seconds to a final temperature of 195° F.

Certain commodities, e.g. cottonseed meats, require a dwell time at a given temperature and moistrue content to achieve, in addition to those result for shop fat and bones, a detoxifying of harmful compounds, e.g. gossypol. By introducing a longer length of pipe between the point of admixture of the dry slurry and the fresh feed slurry and the flash tank, any predetermined reaction time may be introduced.

Various proteinaceous solid materials were dehydrated in equipment similar to that of the FIGURE 1 of the accompanying drawings.

The following table indicates the percent by weight of water, oil and solids in the wet proteinaceous materials:

TABLE I.—WET RAW MATERIALS

| Material | Percent $H_2O$ | Percent oil | Percent solids |
|---|---|---|---|
| Shop fat and bones | 26 | 47 | 27 |
| Fish | 70 | 10 | 20 |
| Poultry offal | 66 | 17 | 17 |
| Kill floor | 60 | 18 | 22 |
| Blood | 90 | 0 | 10 |

Each of the above listed raw feed materials is combined with an oil that has been previously separated from the same type of material. The ratio of total fat to the evaporation system to the oil free dry solids is maintained at about 5.5 to 1. Hence the feed stream to the evaporation system in the case of each of the materials of Table I is as follows:

TABLE II.—EVAPORATOR FEED

| Material | Percent $H_2O$ | Percent oil | Percent solids |
|---|---|---|---|
| Shop fat and bone | 13 | 74 | 13 |
| Fish | 35 | 55 | 10 |
| Poultry offal | 37 | 53 | 9.6 |
| Kill floor | 30 | 58 | 11.8 |
| Blood | 58 | 35 | 7 |

The percent moisture of the stream leaving the evaporator and entering the flash chamber was indicated to be about 1.5 to 3. The dry product from the bottom of the flash chamber was below 1% moisture, said dry product then being processed through a press where the oil or fat is expressed from the material. The fat, then, is recirculated to fluidize the wet raw proteinaceous material at the start of the process.

Prior art dehydration systems are adaptable to the drying of certain proteinaceous systems. They are, however, subject to severe foaming problems which make them inoperable at designed capacities, thus increasing the cost of such systems. Additionally, they require the heating of the slurry during the evaporative step which is deleterious to the protein constituents. Finally, there is no means of controlling the slurries at a controllable and predetermined time, temperature and moisture conditions to carry out required chemical and physical reactions within the systems involved.

By recycling large volumes of dry slurry relative to the input volume of fresh material, for example, in a ratio of ten or twenty or forty parts of dry slurry to one part of fresh material, the temperature of the system upon the addition of the fresh material may be precisely controlled. More sensible heat in the system is thereby provided so that lower evaporation temperatures may be employed. A further consequence and advantage of this same system is the reduction of the total moisture content of the mixed slurries upon the addition of the raw material slurry to the dry slurry. The lower moisture content at this particular point and the fact that no additional heat is put into the system has a beneficial effect upon the protein materials involved. The methods of this invention permit the dry slurry only to be raised to a given temperature, and thereafter, upon the addition of the wet raw material slurry, the temperature is reduced as the moisture flashes from the raw material in a thin film over a predetermined length of time. No post heating or retention of the slurry after the processing in the flash tank is necessary to further moisture removal.

The above examples describe the heating of dried slurry, mixing of the heated dried slurry with wet slurry and thereby lowering the temperature of the dried slurry slightly so that the temperature of the mixture is below the temperature of the dried slurry but above the temperature of the wet slurry. However, it is not absolutely necessary that the relative temperatures of the mixure, the wet slurry and the dried slurry at point 10, be so related. In some cases, it is desirable to sterilize or otherwise prepare the ground raw material by exposing it to a temperature of about 160° to 180° F. for a period of up to one to five minutes. Since the oil being added to the fluidizing tank is at substantially the same temperature as the dried meats slurry being added to the heat exchanger, it is advantageous to add heat to the oil to (a) accomplish the sterilization or preparation and (b) supply the heat necessary for carrying on the drying which occurs after mixing at point 10 within the flash dryer 12. This is shown in FIG. 1 by adding the oil heater 20 in the line from the recycle oil tank 15 to the fluidizing tank 5.

Also, under some circumstances, it is much more economical to operate a multi-element system in which two or more heat exchangers and two or more flash dryers are used in combination. FIG. 2 shows this sort of operation with two heat exchangers and two flash dryers. One section of the system is composed of the heat exchanger, mixing point and flash dryer having the suffix A, similar to that described with respect to FIG. 1, which the second section of the operation is carried on in the heat exchanger 11B, mixing point 10B and dryer 12B, all having the suffix B. Because of the operating conditions, the dried slurry discharging from the second flash dryer 12B has a temperature of about 230° F. Therefore, the oil returning to the fluidizing tank 5 is at substantially the same temperature and the mixture of oil and ground raw material leaving the fluidizing tank 5 is at a temperature of 140° F. to about 170° F. The partially dried slurry discharging from the first flash dryer is at a temperature of perhaps 120 to 140° F. since the flash dryer is operated at a pressure of only 1 to 5 millimeters absolute where water has a boiling point under 100° F. The partially dried slurry is reheated somewhat in heat exchanger 11A but its temperature after discharging from the heat exchanger 11A is lower than the temperature of the wet slurry at point 10A in the operation described in FIG. 2.

What is claimed is:

1. A process for removing moisture from particles of a heat sensitive solid material having an average particle size of about one-fourth of an inch comprising mixing said particles with a liquid having a boiling point higher than that of water to form a first fluidized material, mixing said first fluidized material with a second fluidized material in which the second material is a dehydrated form of the first material to thereby form a mixture and lowering the temperature of the mixture about 2 to 10 degrees to a second temperature, applying a pressure lower than atmospheric to said mixture to suddenly drop the temperature thereof sufficent to provide a temperature differential between the critical temperature of the liquid at said low pressure and the second temperature of at least about 20° F.

2. A process for removing moisture from particles of a heat sensitive solid material having an average particle size of about one-fourth of an inch comprising mixing said particles with a liquid having a boiling point higher than that of water to form a first fluidized material, mixing said first fluidized material with a second fluidized material in which the second material is a dehydrated form of the first material to thereby form a mixture and lowering the temperature of the second material about 2 to 10 degrees to a second temperature, applying a pressure lower than atmospheric to said mixture to suddenly drop the temperature thereof sufficient to provide a temperature differential between the critical temperature of the liquid at said low pressure and the second temperature of at least about 20° F. and maintaining said low pressure on the mixture for at least about twenty-five seconds to thereby remove moisture from said particles without subjecting the same to a high temperature.

3. A process for the removal of moisture from heat sensitive solid proteinaceous materials comprising comminuting said materials to particles of an average size of less than about one-fourth of an inch, fluidizing said particles in an oily liquid having a boiling point higher than the boiling point of water to form a fluidized material, mixing said fluidized material with a previously dehydrated fluidized material to lower the temperature of said previously dehydrated fluidized material about two to ten degrees Fahrenheit to a second temperature, moving the resultant mixture into an atmosphere having a low pressure, suddenly and explosively flashing off the moisture by dropping the temperature of said fluidized material mixture to provide a temperature differential of about 100° F. between the critical temperature of the liquid at said low pressure and the second temperature, and maintaining said low pressure for about 10 to 50 seconds.

4. A process for the removal of moisture from heat sensitive solid materials which comprises comminuting the raw material to particles of less than one-fourth of an inch, fluidizing such particles in a high boiling point liquid, heating a previously dehydrated fluidized system of the same raw material and liquid, mixing an amount of such dehydrated fluidized material with an amount of fluidized raw material so that the temperature drop upon such admixture is in the range of two to ten degrees F., introducing such mixture into a flash chamber under a vacuum such that the temperature differential between the critical temperature of water at that vacuum and the temperature of the mixture is in the order of about 100° F., and maintaining said mixture in said vacuum for a dwell time of at least about 25 seconds to dehydrate the mixture.

5. A process for the removal of moisture from a heat sensitive solid proteinaceous raw material, the process comprising the steps of comminuting the material to particles having an average size of less than about one-fourth of an inch, fluidizing such particles in a liquid having a boiling point higher than water, heating a previously dehydrated fluidized system of the same raw material and liquid, mixing an amount of such dehydrated fluidized material with an amount of fluidized raw material so that the temperature drop upon such admixture is in the range of two to ten degrees F., introducing such mixture into a flash chamber and under a vacuum such that the temperature differential between the normal boiling point of water at said vacuum and the temperature of the mixed fluidized system is in the order of about 20 to 125° F., and maintaining said mixture in said vacuum for about 25 seconds to dehydrate the mixture.

6. A process for continuously removing moisture from a heat sensitive proteinaceous solid material, the process comprising continuously heating a slurry of wet particles of said material in a liquid oil having a boiling point higher than that of water, by continuously mixing one part by weight of said slurry of wet material with about 3 to 20 parts by weight of a heated previously dehydrated slurry of said material to provide a mixture having a temperature of about 150° F. to 240° F., flash vaporizing the moisture from the wet material by continuously feeding said mixture to a flash dryer having sub-atmospheric pressure to provide a temperature differential of at least about 20° F. between the critical temperature of water at the sub-atmospheric pressure and the temperature of the mixture, and maintaining said flash vaporizing for at least about 10 seconds to flash off substantially all the moisture and provide a dry expanded porous solid material.

7. A process as defined in claim 6 in which the material is proteinaceous animal tissue.

8. A process as defined in claim 6 in which the material is proteinaceous vegetable materials.

9. A process as defined in claim 6 in which the material is peanut meats.

10. A process as defined in claim 6 in which the material is cottonseed meats.

11. A process as defined in claim 6 in which the material is fish tissue.

12. A process for removing moisture from finely divided particles of wet peanut meats in a slurry of peanut oil, the process comprising the steps of heating the slurry of wet peanut meats to about 220° F., mixing one part by weight of said slurry with about 10 parts by weight of a second slurry of previously dehydrated peanut meats in a slurry of peanut oil to lower the temperature of the admixture about 5° F. from about 215° F. to prevent deterioration of the meats due to temperature and at the same time build up and maintain sufficient sensible heat in the admixture to vaporize the moisture and rupture the surface of the meats, flash vaporizing the moisture from the meats by moving the meats into a chamber having a sub-atmospheric pressure of about 2 mm. Hg, and maintaining said pressure on the meats for at least about 25 seconds to flash off substantially all of the moisture to provide a dry expanded porous structure.

13. A process for removing moisture from finely divided particles of wet cottonseed meats in a slurry of cottonseed oil, the process comprising the steps of heating the slurry of wet cottonseed meats to about 190° F., by mixing one part by weight of said slurry with about 10 parts by weight of a second slurry of previously dehydrated cottonseed meats in a slurry of cottonseed oil to lower the temperature of the admixture about 2° F. from about 220° F. to prevent deterioration of the meats due to temperature and at the same time build up and maintain sufficient sensible heat in the admixture to vaporize the moisture and rupture the surface of the meats, flash vaporizing the moisture from the meats by moving the meats into a chamber having a sub-atmospheric pressure of about 2 mm. Hg, and maintaining said pressure on the meats for at least about 25 seconds to flash off substantially all of the moisture to provide a dry expanded porous structure.

14. A process for removing moisture from finely divided particles of wet animal tissue in a slurry of animal oil, the process comprising the steps of heating the slurry of wet animal tissue to about 190° F. mixing one part by weight of said slurry with about 10 parts by weight of a second slurry of previously dehydrated animal tissue in a slurry of animal oil to lower the temperature of the admixture about 5° F. to about 220° F. to prevent deterioration of the meats due to temperature and at the same time build up and maintain sufficient sensible heat in the admixture to vaporize the moisture and rupture the surface of the tissue, flash vaporizing the moisture from the tissue by moving the tissue into a chamber having a sub-atmospheric pressure of about 2 mm. Hg, and maintaining said pressure on the tissue for at least about 25 seconds to flash off substantially all of the moisture to provide a dry expanded porous structure.

15. A process as defined in claim 1, including the step of subjecting said heat sensitive solid material to a temperature of about 160° to 180° F. for a period of up to one to five minutes ahead of said mixing step.

16. A process as defined in claim 1, wherein said lowering of the temperature of the mixture of said first and second materials includes the lowering of the temperature of said first material by a slight amount.

References Cited

UNITED STATES PATENTS 3,310,881     3/1967     Fritzberg   ---------- 99—199 X LIONEL M. SHAPIRO, *Primary Examiner.*

U.S. Cl. X.R.

99—204, 208, 209; 260—123.5